(12) United States Patent
Joseph

(10) Patent No.: US 7,341,245 B2
(45) Date of Patent: Mar. 11, 2008

(54) SWAY BAR BUSHING AND SYSTEM

(75) Inventor: Jerry Joseph, Woodcliff Lake, NJ (US)

(73) Assignee: Research & Mfg. Corp. of America, Linden, NJ (US)

( * ) Notice: Subject to any disclaimer, the term of this patent is extended or adjusted under 35 U.S.C. 154(b) by 0 days.

(21) Appl. No.: 10/824,997

(22) Filed: Apr. 15, 2004

(65) Prior Publication Data

US 2004/0227281 A1    Nov. 18, 2004

Related U.S. Application Data

(63) Continuation of application No. 10/420,051, filed on Apr. 18, 2003, now Pat. No. 6,971,640.

(51) Int. Cl.
 *F16F 7/00* (2006.01)
(52) U.S. Cl. .................. 267/141; 267/33; 267/257
(58) Field of Classification Search .. 267/141.1–141.4, 267/33, 153, 196, 141, 140.4, 292, 293, 257, 267/258; 248/560, 615, 632–634
See application file for complete search history.

(56) References Cited

U.S. PATENT DOCUMENTS

| | | | | |
|---|---|---|---|---|
| 3,448,994 A | * | 6/1969 | King et al. ........... 280/124.106 |
| 5,169,244 A | * | 12/1992 | Siebert et al. ............. 384/276 |
| 5,352,055 A | * | 10/1994 | Hellon et al. ................ 403/24 |
| 5,437,439 A | * | 8/1995 | Brokamp et al. ........... 267/293 |
| 5,520,465 A | * | 5/1996 | Kammel .................... 384/220 |
| 5,565,251 A | * | 10/1996 | Tang et al. ................ 428/36.8 |
| 5,743,987 A | * | 4/1998 | Tang et al. ............ 156/244.11 |
| 5,865,429 A | * | 2/1999 | Gautheron ............... 267/141.7 |
| 6,513,801 B1 | * | 2/2003 | McCarthy ................... 267/293 |
| 6,889,988 B2 | * | 5/2005 | Cai et al. .............. 280/124.107 |

FOREIGN PATENT DOCUMENTS

KR     1999-369376     *  7/1999

* cited by examiner

*Primary Examiner*—Pam Rodriguez
(74) *Attorney, Agent, or Firm*—Lackenbach Siegel, LLP

(57) ABSTRACT

A bushing member includes a hinge portion enabling improved assembly and, in some embodiments, an optional flange and a seal design that limits moisture entry also ensures an improved fit when secured with a matching bracket compressing the bushing in a beneficial manner.

17 Claims, 2 Drawing Sheets

SWAY BAR BUSHING AND SYSTEM

PRIORITY STATEMENT

This application claims priority from U.S. application Ser. No. 10/420,051, filed Apr. 18, 2003 now U.S. Pat. No. 6,971,640, the contents of which are incorporated herein by reference.

BACKGROUND OF THE INVENTION

1. Field of the Invention

The present invention relates to a support system. More specifically, the present invention relates to an improved bushing and a bracket member for use in securing a bar to a frame.

2. Description of the Related Art

As described in the background section of Applicant's earlier application U.S. Ser. No. 10/420,051, filed Apr. 18, 2003, the contents of which are incorporated herein, sway bar bushings are often provided in concert with various brackets that are bolted to frame members.

One improvement provided in Applicant's earlier application, particularly as shown in FIG. 4, a circular sway bar is captured within a sway bar bushing which provides an improved leak-resistant seal about the outer circumference of the bar. The bushing is molded in a beneficial shape enabling secure assembly with a bracket and a frame member while resisting unintended entry of debris.

The designs and features of the Application improved the bushing's resistance to unintended deformation during installation compression and later use on the road. As a consequence of this design, the bushing is strengthened in particular areas, and sealing action is improved.

During trials it was noted that this design improved a sealing action about the sway bar but, in select circumstances particularly under stress, did not always provide sufficient or uniform pressure on the external lip portions sealing about the sway bar itself risking moisture entry along the bushing-bar interface.

As an additional detriment, it is noted that Applicant's earlier bushing was often installed incorrectly by untrained personnel, without the bracket for which it was designed. Where the bushing was assembled incorrectly, the bushing tended to slip laterally relative to a bar and a frame member risking loss of support.

An additional detriment may exist with particularly large bushings or where the installer is of smaller stature or has reduced hand strength. During assembly, the user must open the bushing widely, sufficient to encompass the sway bar. With particularly large bushings, or those made from a beneficially hard elastomeric compound, opening the bushing is very difficult. As a consequence, lubricant is often added to the bushing or the bushing is forced open prior to assembly risking cracking near the hinge portion of the bushing, and contamination or damage where the lubricant degrades.

Finally, it was noted that Applicant's earlier assembly was, in part, difficult to assemble because the assembly required 'wing' members to extend laterally from the bracket. During installation, users often crammed or force-fit the bracket in place causing misalignment and damage to the bushing.

In sum, while Applicant's earlier invention provided many improvements the risks of untrained personnel and human intervention raised at least the following risks:

1. Force-fitting the bracket over the bushing risks damage to the bushing and misalignment risking unintended lateral displacement.
2. Undue, insufficient, excessive, or poorly distributed stress about the outer sealing lip portions of the bracket increases the risk of leakage.
3. Undue opening stress of the bracket risks the generation of structural damage or cracks in the bushing reducing life span and increasing the assembly time.

OBJECTS AND SUMMARY OF THE INVENTION

It is thus a general object of the present invention is to provide at least one embodiment that overcomes at least one of the detriments noted above in the conventional art.

In carrying out the above object, and other objects, features, and advantages of the present invention at least one sway bar bushing and system are provided.

The present invention relates to a bushing member including a hinge portion enabling improved assembly and, in some embodiments, a flange and a seal design that limits moisture entry and ensures an improved fit when secured with a matching bracket compressing the bushing in a beneficial manner.

According to an embodiment of the present invention, there is provided a bushing member, comprising: an elastomeric member defining a central opening between a front face and a rear face, a slot in the bushing along a first side of the elastomeric member providing a lateral access from an exterior of the elastomer member to the central opening, hinge means for reducing an opening force of the elastomeric member and for easing the lateral access to the central opening, and at least a part of the hinge means for reducing positioned proximate a second side of the elastomeric member distal the slot, whereby during an opening of the bushing member the hinge means reduces an opening force required for separating the slot and inserting an external member into the central opening and improves a smooth transfer of the external member into the slot.

According to another embodiment of the present invention, there is provided a bushing member, further comprising: an outer seal member on each respective the front and rear face, and the outer seal member bounding the central opening and joining respective sides of the slot to provide a seal with the external member, whereby when the external member is assembled with the bushing member the outer seal member provides a sealing contact with the external member and minimizes a debris entry to the central opening.

According to another embodiment of the present invention, there is provided a bushing member, further comprising: at least a first and a second flange member extending outwardly from an outer edge portion of the elastomeric member proximate respective the front face and the rear face.

According to another embodiment of the present invention, there is provided a bushing member, wherein: the first and the second flange members define respective hinge portions proximate the second side wherein a thickness of respective flange members is reduced, the hinge means for reducing includes the respective hinge portions, and the hinge portions minimizing the opening force of the elastomeric member and easing the lateral access to the central opening during an insertion of the external member, whereby an opening stress on the bushing member is minimized and a risk of damaging the bushing member is reduced.

According to another embodiment of the present invention, there is provided, a bushing member, comprising: an elastomeric member defining a central opening between a front face and a rear face, a slot in the bushing along a first side of the elastomeric member providing a lateral access from an exterior of the elastomer member to the central opening, hinge means for reducing an opening force of the elastomeric member and means for easing the lateral access to the central opening, at least a part of the hinge means for reducing being positioned proximate a second side of the elastomeric member distal the slot, whereby during an opening of the bushing member the hinge means reduces an opening force required for separating the slot and inserting an external member into the central opening, an outer seal member on each respective the front and rear faces, and the outer seal member bounding the central opening and joining respective sides of the slot to provide a seal with the external member, whereby when the external member is assembled with the bushing member the outer seal member provides a sealing contact with the external member and minimizes a debris entry to the central opening.

According to another embodiment of the present invention, there is provided, a bushing member, further comprising: at least a first and a second flange member extending outwardly from an outer edge portion of the elastomeric member proximate respective the front face and the rear face and respective the outer seal members.

According to another embodiment of the present invention, there is provided, a bushing member, wherein: the first and the second flange members respective defining hinge portions proximate the second side wherein a thickness of respective flange members is reduced, the hinge means for reducing includes the respective hinge portions, and the hinge portions minimizing the opening force of the elastomeric member and easing the lateral access to the central opening during an insertion of the external member, whereby an opening stress on the bushing member is minimized and a risk of damaging the bushing member is reduced.

According to another embodiment of the present invention, there is provided, a bushing member, comprising: an elastomeric member defining a central opening between a front face and a rear face, a slot in the bushing along a first side of the elastomeric member providing a lateral access to the central opening, hinge means for reducing an opening force of the elastomeric member and easing the lateral access to the central opening, at least a part of the hinge means positioned proximate a second side of the elastomeric member distal the slot, an outer seal member on each respective the front and rear face, and at least a first and a second flange member extending outwardly from an outer edge portion of the elastomeric member proximate respective the front face and the rear face.

According to another embodiment of the present invention, there is provided, a bushing member, wherein: the first and the second flange members defining respective hinge portions proximate the second side wherein a thickness of respective flange members is reduced, the hinge means for reducing including the respective hinge portions, and the hinge portions minimizing the opening force of the elastomeric member and easing the lateral access to the central opening during an insertion of the external member, whereby an opening stress on the bushing member is minimized and a risk of damaging the bushing member is reduced.

According to another embodiment of the present invention, there is provided a bracket assembly, comprising: an elastomeric member defining a central opening between a front face and a rear face, a slot in the bushing along a first side of the elastomeric member providing a lateral access to the central opening, hinge means for reducing an opening force of the elastomeric member and for easing the lateral access to the central opening, at least a part of the hinge means for reducing proximate a second side of the elastomeric member distal the slot, whereby during an opening of the bushing member the hinge means reduces an opening force required for separating the slot and inserting an external member into the central opening, and a rigid bracket member bounding a portion of the elastomeric member, whereby when assembled the bracket member is shaped to slide over a saddle portion of the elastomeric member.

According to another embodiment of the present invention, there is provided a bracket assembly, further comprising: at least a first and a second flange member extending outwardly from an outer edge portion of the elastomeric member proximate respective the front face and the rear face.

According to another embodiment of the present invention, there is provided a bracket assembly, wherein: the first and the second flange members define respective hinge portions proximate the second side wherein a thickness of respective flange members is reduced, the hinge means for reducing includes the respective hinge portions, and the hinge portions minimizing the opening force of the elastomeric member and easing the lateral access to the central opening during an insertion of the external member, whereby an opening stress on the bushing member is minimized and a risk of damaging the bushing member is reduced.

According to another embodiment of the present invention, there is provided a bracket assembly, further comprising: an outer seal member on the respective front face and the rear face, and the outer seal member bounding the central opening and joining respective sides of the slot to provide a seal with the external member, whereby when the external member is assembled with the bushing member the outer seal member provides a sealing contact with the external member and minimizes a debris entry to the central opening.

According to another embodiment of the present invention, there is provided a bracket assembly, further comprising: means for positioning and stiffening the rigid bracket member, a first and a second edge member in the means for positioning, and the first and second edge members extending away from an outer portion of the ridge member, whereby the edge members provide at least a guiding alignment to the elastomeric member during an assembly.

According to another embodiment of the present invention, there is provided a bracket assembly, wherein: the edge member includes a compression portion extending proximate the first and second flange members, whereby during an assembly of the bracket and the elastomeric member the compression portions contact respective the first and second flange members and provide an urging compression force proximate the respective front and rear faces thereby improving a sealing force about the external member.

According to another embodiment of the present invention, there is provided a bracket assembly, wherein: the edge member further includes a strengthening portion extending along opposing wing sections laterally extending from sides of the bracket member, and the strengthening portions increasing a rigidity of the bracket member and minimize an unintended deformation of the wing sections during the assembly.

According to another embodiment of the present invention, there is provided a bushing assembly kit, comprising: an elastomeric member defining a central opening between a front face and a rear face, a slot in the bushing along a first side of the elastomeric member providing a lateral access to the central opening, hinge means for reducing an opening force of the elastomeric member and for easing the lateral access to the central opening during an insertion of an external member into the central opening, at least a part of the hinge means for reducing proximate a second side of the elastomeric member distal the slot, at least a first and a second flange member extending outwardly from an outer edge portion of the elastomeric member proximate respective the front face and the rear face and respective the outer seal members and defining a saddle region therebetween, an outer seal member on the respective front face and the rear face, and a rigid bracket member bounding a portion of the elastomeric member and covering the saddle region between the first and second flange members and providing a compressive force to the elastomeric member during an assembly, whereby the compressive force urges the slot into a sealed position and provides a sealing force to the outer seal members and the first and second flange members, whereby the bushing assembly enables a tight seal between the elastomeric member and the external member.

According to another embodiment of the present invention, there is provided a bushing assembly kit, further comprising: means for positioning and stiffening the rigid bracket member, a first and a second edge member in the means for positioning, and the first and second edge members extending away from an outer portion of the ridge member proximate the saddle region, whereby the edge members provide at least a guiding alignment to the elastomeric member during an assembly.

According to another embodiment of the present invention, there is provided a method of assembling a sway bar bushing assembly, comprising the steps of: selecting an elastomeric member, the elastomeric member defining a central opening between a front face and a rear face, and further comprising: a slot in the bushing along a first side of the elastomeric member providing a lateral access to the central opening, hinge means for reducing an opening force of the elastomeric member and easing the lateral access to the central opening, at least a part of the hinge means for reducing proximate a second side of the elastomeric member distal the slot, whereby during an opening of the bushing member the hinge means reduces an opening force required for separating the slot and inserting an external member into the central opening, applying an opening force to the bushing member to open the slot and laterally inserting the external member into the central opening, selecting a bracket member and placing the bracket member over the elastomeric member, and securing the bracket member and the elastomeric member to an external frame member.

According to another embodiment of the present invention, there is provided a method of assembling a sway bar bushing assembly, wherein: the step of securing further comprises a step of: compressing the elastomeric member sufficiently to press closed the slot and provide a leak resistant seal along at least the slot thereby minimizing moisture access to the external member.

The above, and other objects, features and advantages of the present invention will become apparent from the following description read in conduction with the accompanying drawings, in which like reference numerals designate the same elements.

DETAILED DESCRIPTION OF THE PREFERRED EMBODIMENTS

In the automotive industry, particularly the automotive repair industry, accurate measurement during automotive repair is essential to ensure long life and safe use of new and replacement parts. Many automotive repairs are conducted in sub-optimal conditions, at awkward angles, or in hot, dirty, or wet conditions unsuitable to careful and deliberate replacement of bushings and brackets. Often, the replacement of bushings and brackets is a hurried and imprecise job. Unfortunately, inaccurate installation shortens the life of the bushing, bracket, and sway bar through added stress, corrosion, and oxidation. Consequently, it is important to have a bushing and assembly that is both easily and quickly installed and provides a good seal where needed.

Figure 1:
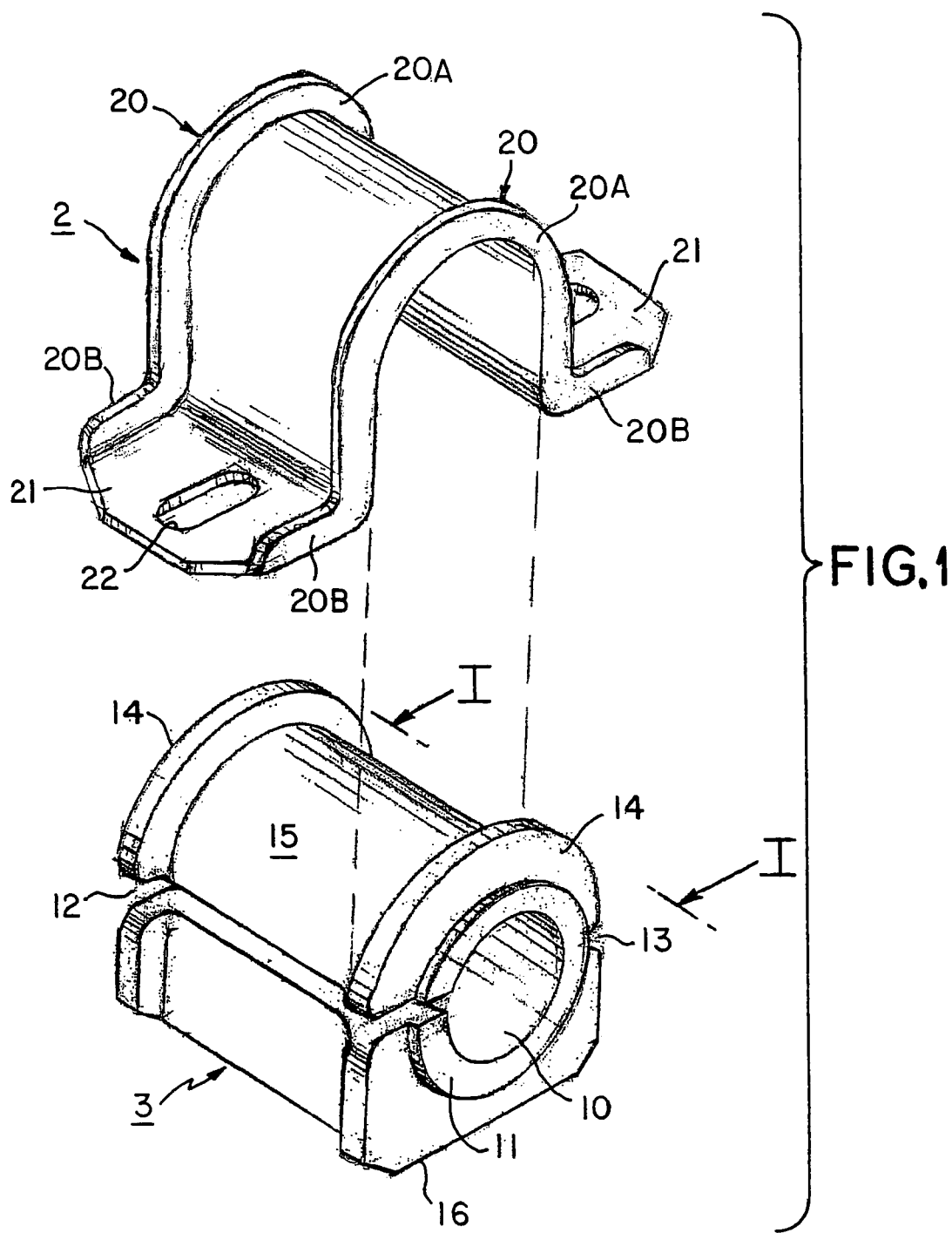
FIG. 1 is an exploded perspective view of a bushing and bracket assembly.
Figure 2:
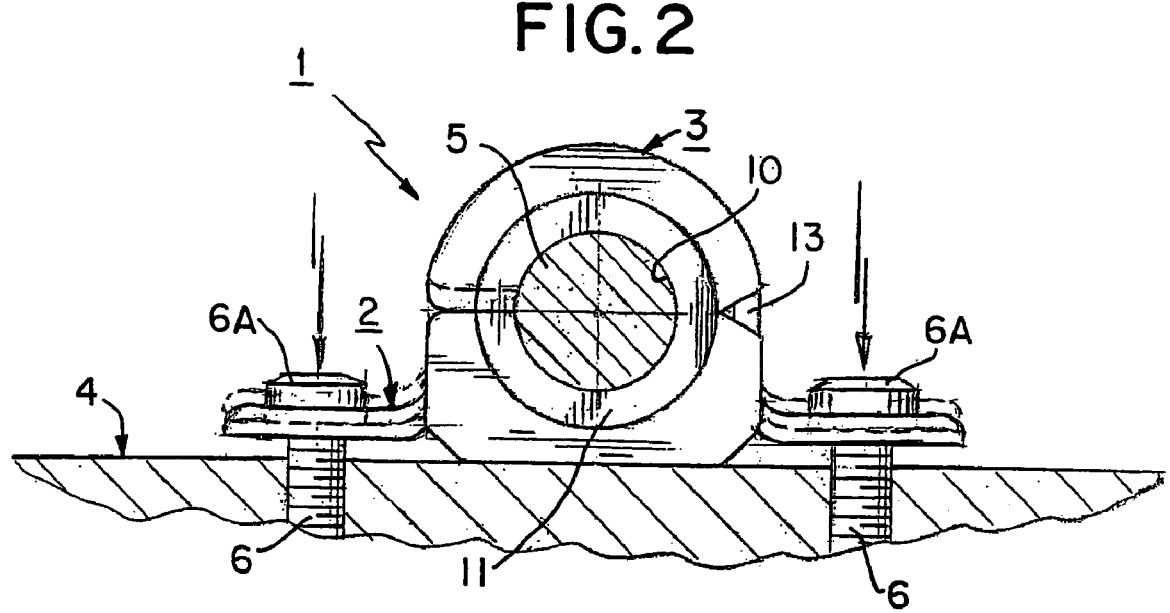
FIG. 2 is a side view of a bushing and bracket assembly.
Figure 3:
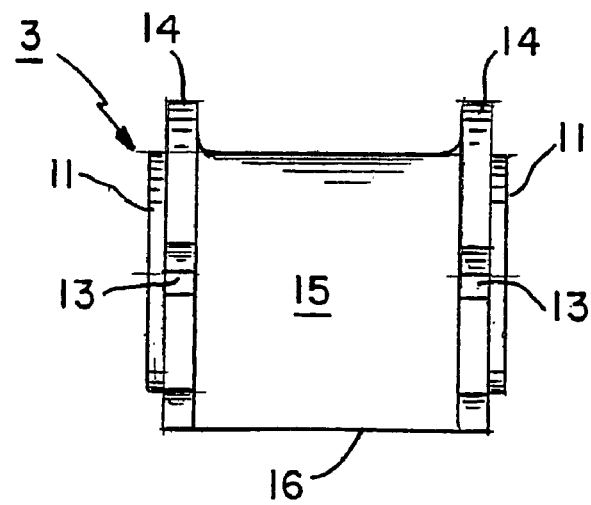
FIG. 3 is a side view of a bushing viewed along direction I-I in FIG. 1.

Referring now to FIGS. 1 through 3, a bushing assembly 1 includes a bracket member 2 and a bushing member 3. During assembly, bushing member 3 is opened and forced over a sway bar member 5 extending laterally through a central opening 10. Bracket member 2 is then urged over bushing member 3 and assembled with a frame member 4 using bolts 6, 6, having respective head 6A, 6A and extending through lateral or elongated holes 22, 22, as shown.

Bushing member 3 includes a side opening or slit 12 along a first side. Opening slit 12 has smoothed or slopped outer portions (as shown) providing an improved engagement with sway bar member 5. In use, a user opens bushing member 3 slightly and places the sloped outer portions against sway bar member 5 and pushes enabling the slopped or curved outer portions to slid along sway bar member 5 and further open bushing member 3.

While bushing member 3 may be made from any suitable material, preferred embodiments of bushing member 3 are constructed from a flexible, but firm, elastomeric material capable of durable use in the automotive and transport industry and resisting the stresses of sway-bar-bushing assembly. Bushing member 3 is also constructed from an elastomeric compound capable of resisting the chemical and corrosive attacks of winter salt and cleaning fluids.

A hinge member or pair of hinge portions portion 13, 13 is positioned opposite side opening slit 12 in bushing member 3. A pair of opposing flange portions or members 14, 14 project outwardly from bushing member 3 as shown and define a middle saddle 15 region therebetween opposite a supporting bottom portion or base portion 16. Hinge portions 13, 13 extend through respective flange portions 14, 14 and divide flange portions 14, 14 as shown, enabling a user to open bushing member 3 without damaging flange portions 14, 14.

While hinge portions 13, 13 are shown with sloped or angular openings in flange portions 14, 14, other designs are envisioned without departing from the scope and spirit of the present invention. Alternative embodiments of the present invention may include hinge portions 13 as curved openings in each flange portion 14, or even a continuous slot or open molded portion (not shown) extending between flange portions 14, 14 along one side of bushing member 3. Hinge portions 13, 13 act as stress reduction cites or means for minimizing, moderating, or reducing an opening force of bushing member 3 while enabling bushing member 3 to be constructed from a firm elastomeric material, normally difficult to open. Hinge portions 13, 13 also prevent flange portions 13, 13 from buckling near the hinge area of bushing 3 opposite opening slot 12 and damaging bushing 3.

A pair of continuous outer seals or lip members 11, 11 surround outer portions of each side of central opening 10 and provide a sealing engagement with the surface of sway bar member 4 during assembly and use.

Bracket member 2 includes a pair of smoothly rolled edges 20, 20 acting as stiffening ridges for stiffening bracket member 2, and as positioning members for aiding an aligned engagement with corresponding flange members 14, 14. Edges 20, 20 each include strengthening and stability portions 20B, 20B on extending flange portions containing elongated holes 22, 22. Edges 20, 20 also include compression and strengthening portions 20A, 20A extending between respective stability portions 20B.

Edges 20, 20 may be made in any reasonable manner common to the metal-forming arts, and extend generally laterally or perpendicularly from the outer edges of bracket member 2, and include a smooth transition from the inner or bottom surface of bracket 2 contacting bushing 3, saddle region 15, or frame member 2 upwardly away from bracket member 2, as shown. Since edges 20, 20 extend away from the body of bracket member 2 they serve to minimize a torsional or longitudinal flexing of bracket 2 during assembly improving a secure and uniform fit between the components.

As an additional benefit, edges 20 allow an increased amount of attachment force to be applied to bracket wings 21, 21 via bolts 6, 6 during installation. Since the outer wings 21, 21 are stiffer (with the stiffening effect of strengthening portions 20B) a user may apply additional force to bolts 6 without having the wing portions 21, 21 of bracket member 4 bend, contact frame member 4, and limit the available compressive force that may be applied to bushing member 3 to secure bar member 5.

As an additional benefit of the present design, saddle region 15 provides a smooth and continuous contact with the inner surface of bracket member 2 enabling the improved transfer of compressive force to bushing 3 during an assembly process. This improved transfer of compressive force enables a more secure fit for assembly 1, namely between frame 4, bushing 3, bracket 2 and bar 5.

As seen in FIG. 2, an overall height of bushing member 3 is greater than the depth of bracket member 2 causing bottom portion or base 16 to project outwardly when first assembled. In this pre-compression position, gap or opening slit 12 is spaced apart. As bolts 6, 6, are tightened, bracket member 2 contact saddle region 15 and edges 20, 20 contact respective flange members 14, 14. Additionally, slit or opening 12 is closed forming a sealed area along the length of bar member 5 passing through central opening 10. As pressure is additionally tightened, bracket member 2 additionally compresses bushing 3 and rolled edges 20, 20 contact flanges 14, 14 and provide a sealing urging about continuous outer seals 11, 11. As an additional benefit, flange members 14, 14 and edges 20, 20 interlock and prevent bushing 3 from shifting laterally or torsionally relative to bracket 4 and causing misalignment during assembly and tightening. As is also noted in FIG. 2, a portion of rolled edge 20, 20 covers the open gap in flange members 14, 14 created by hinge member portion 13, 13 and provides a sealing urge relative to outer seals 11 and bar member 5. As a consequence of the present design for bracket member 2, bracket member 2 may be made thinner with less raw material and still achieve similar stiffness levels provided by a bracket constructed from thicker materials.

As described above, the various features of the present bushing design act in concert to achieve at least one of the advantages sought, while still allowing the use of simple flat or U-shaped brackets without the beneficially stiffened or rolled edges 20, 20. Where the present bushing design is used in concert with the present bracket design at least one additional advantage is provided through additional sealing force and the ability to tighten-to-spec a bracket and the compressive holding force applied to a bar member 5.

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A bushing member, comprising:
   an elastomeric member defining a central opening between an opposing front face and a rear face, said front face and rear face being perpendicular to the axis of the central opening;
   a slot in said bushing along a first side of said elastomeric member providing a lateral access from an exterior of said elastomer member to said central opening;
   a continuous hinge configured as part of said elastomeric member;
   at least a part of said continuous hinge positioned proximate a second side of said elastomeric member distal said slot, whereby during an opening of said bushing member said continuous hinge reduces an opening force required for separating said slot and inserting an external member into said central opening and improves a smooth transfer of said external member into said slot; and
   at least a first and a second flange member extending outwardly and generally perpendicular to the axis of the central opening extending substantially along an outer edge portion of said elastomeric member proximate respective said front face and said rear face and between said first and second sides of said elastomeric member, thereby forming a saddle portion of said elastomeric member therebetween which extends substantially the entire length of the elastomeric member.

2. A bushing member, according to claim 1, further comprising:
   an outer seal member on each respective said front and rear face; and
   each said outer seal member bounding said central opening and joining respective sides of said slot to provide a seal with said external member, whereby when said external member is assembled with said bushing member each said outer seal member provides a sealing contact with said external member and minimizes a debris entry to said central opening.

3. A bushing member, according to claim 2, wherein:
said first and said second flange members define respective hinge portions proximate said second side wherein a thickness of respective said flange members is reduced;
said continuous hinge includes said respective hinge portions; and
said hinge portions minimizing said opening force of said elastomeric member and easing said lateral access to said central opening during an insertion of said external member, whereby an opening stress on said bushing member is minimized and a risk of damaging said bushing member is reduced.

4. A bushing member, comprising:
an elastomeric member defining a central opening between an opposing front face and a rear face said front face and rear face being perpendicular to the axis of the central opening;
a slot in said bushing along a first side of said elastomeric member providing a lateral access from an exterior of said elastomer member to said central opening;
a continuous hinge configured as part of said elastomeric member, at least a part of said continuous hinge being positioned proximate a second side of said elastomeric member distal said slot, whereby during an opening of said bushing member said continuous hinge reduces an opening force required for separating said slot and inserting an external member into said central opening;
an outer seal member on each respective said front and rear faces;
each said outer seal member bounding said central opening and joining respective sides of said slot to provide a seal with said external member, whereby when said external member is assembled with said bushing member each said outer seal member provides a sealing contact with said external member and minimizes a debris entry to said central opening; and
at least a first and a second flange member extending outwardly and generally perpendicular to the axis of the central opening and extending substantially along an outer edge portion of said elastomeric member proximate respective said front face and said rear face and between said first and second sides of said elastomeric member and respective said outer seal members.

5. A bushing member, according to claim 4, wherein:
said first and said second flange members defining respective hinge portions proximate said second side wherein a thickness of respective said flange members is reduced;
said continuous hinge including said respective hinge portions; and
said hinge portions minimizing said opening force of said elastomeric member and easing said lateral access to said central opening during an insertion of said external member, whereby an opening stress on said bushing member is minimized and a risk of damaging said bushing member is reduced.

6. A bushing member, comprising:
an elastomeric member defining a central opening between an opposing front face and a rear face, said front face and rear face being perpendicular to the axis of the central opening;

a slot in said bushing along a first side of said elastomeric member providing a lateral access to said central opening;
a continuous hinge configured as part of said elastomeric member, at least a part of said continuous hinge positioned proximate a second side of said elastomeric member distal said slot,
an outer seal member on each respective said front and rear face; and
at least a first and a second flange member extending outwardly and generally perpendicular to the axis of the central opening and extending substantially along an outer edge portion of said elastomeric member proximate respective said front face and said rear face and between said first and second sides of said elastomeric member.

7. A bushing member, according to claim 6, wherein:
said first and said second flange members defining respective hinge portions proximate said second side wherein a thickness of respective said flange members is reduced;
said continuous hinge including said respective hinge portions; and
said hinge portions minimizing said opening force of said elastomeric member and easing said lateral access to said central opening during an insertion of said external member, whereby an opening stress on said bushing member is minimized and a risk of damaging said bushing member is reduced.

8. A bracket assembly, comprising:
an elastomeric member defining a central opening between an opposing front face and a rear face, said front face and rear face being perpendicular to the axis of the central opening;
a slot in along a first side of said elastomeric member providing a lateral access to said central opening;
a continuous hinge;
configured as part of said elastomeric member, at least a part of said continuous hinge proximate a second side of said elastomeric member distal said slot, whereby during an opening of said bushing member said continuous hinge reduces an opening force required for separating respective sides of said slot and inserting an external member into said central opening;
a rigid bracket member bounding a portion of said elastomeric member, whereby when assembled said bracket member is shaped to slide over a saddle portion of said elastomeric member; and
at least a first and a second flange member extending outwardly and generally perpendicular to the axis of the central opening and extending substantially along an outer edge portion of said elastomeric member proximate respective said front face and said rear face and between said first and second sides of said elastomeric member, whereby said saddle portion is formed between said respective spaced apart first and second flange members.

9. A bracket assembly, according to claim 8, wherein:
said first and said second flange members define respective hinge portions proximate said second side wherein a thickness of respective said flange members is reduced;
said continuous hinge including said respective hinge portions; and
said hinge portions minimizing said opening force of said elastomeric member and easing said lateral access to said central opening during an insertion of said external member, whereby an opening stress on said bushing member is minimized and a risk of damaging said bushing member is reduced.

10. A bracket assembly, according to claim 8, further comprising:
an outer seal member on each said respective front face and said rear face; and
each said outer seal member bounding said central opening and joining respective sides of said slot to provide a seal with said external member, whereby when said external member is assembled with said bushing member each said outer seal member provides a sealing contact with said external member and minimizes a debris entry to said central opening.

11. A bracket assembly, according to claim 9, further comprising:
means for positioning and stiffening said rigid bracket member;
a first and a second edge member in said means for positioning; and
said first and second edge members extending away from an outer portion of said rigid bracket member, whereby said edge members provide at least a guiding alignment to said elastomeric member during an assembly.

12. A bracket assembly, according to claim 11, wherein:
each said edge member includes a compression portion extending proximate said first and second flange members, whereby during an assembly of said bracket and said elastomeric member said compression portions contact respective said first and second flange members and provide an urging compression force proximate said respective front and rear faces thereby improving a sealing force about said external member.

13. A bracket assembly, according to claim 12, wherein:
each said edge member further includes a strengthening portion extending along opposing wing sections laterally extending from sides of said bracket member; and
said strengthening portions increasing a rigidity of said bracket member and minimizing an unintended deformation of said wing sections during said assembly.

14. A bushing assembly kit, comprising:
an elastomeric member defining a central opening between an opposing front face and a rear face, said front face and rear face being perpendicular to the axis of the central opening;
a slot in along a first side of said elastomeric member providing a lateral access to said central opening;
a continuous hinge configured as part of said elastomeric member, at least a part of said continuous hinge proximate a second side of said elastomeric member distal said slot,
at least a first and a second flange member extending outwardly and generally perpendicular to the axis of the central opening and extending substantially along an outer edge portion of said elastomeric member proximate respective said front face and said rear face and between said first and second sides of said elastomeric member and defining a saddle region there between which extends substantially the entire length of the elastomeric member;
an outer seal member on each said respective front face and said rear face; and
a rigid bracket member bounding a portion of said elastomeric member and covering said saddle region between said first and second flange members and providing a compressive force to said elastomeric member during an assembly, whereby said compressive force urges said slot into a sealed position and provides a sealing force to said outer seal members and said first and second flange members, whereby said bushing assembly enables a tight seal between said elastomeric member and said external member.

15. A bushing assembly kit, according to claim 14, further comprising:
means for positioning and stiffening said rigid bracket member;
a first and a second edge member in said means for positioning; and
said first and second edge members extending away from an outer portion of said rigid bracket member proximate said saddle region, whereby said edge members provide at least a guiding alignment to said elastomeric member during an assembly.

16. A method of assembling a sway bar bushing assembly, comprising the steps of:
selecting an elastomeric member;
said elastomeric member defining a central opening between an opposing front face and a rear face, said front face and rear face being perpendicular to the axis of the central opening, and further comprising:
a slot in said bushing along a first side of said elastomeric member providing a lateral access to said central opening;
a continuous hinge-configured as part of said elastomeric member, at least a part of said continuous hinge proximate a second side of said elastomeric member distal said slot, whereby during an opening of said bushing member said hinge means reduces an opening force required for separating said slot and inserting an external member into said central opening;
at least a first and a second flange member extending outwardly and generally perpendicular to the axis of the central opening and extending substantially along an outer edge portion of said elastomeric member proximate respective said front face and said rear face and between said first and second sides of said elastomeric member;
applying an opening force to said bushing member to open said slot and laterally inserting said external member into said central opening;
selecting a bracket member and placing said bracket member over said elastomeric member; and
securing said bracket member and said elastomeric member to an external frame member.

17. A method for assembling a sway bar bushing assembly, according to claim 16, wherein:
said step of securing further comprises a step of:
compressing said elastomeric member sufficiently to press closed said slot and provide a leak resistant seal along at least said slot thereby minimizing moisture access to said external member.

* * * * *